July 10, 1951          B. V. GIESEY          2,560,283
FLUID CONTROL SYSTEM FOR FLASH WELDERS
Filed Nov. 15, 1946          2 Sheets-Sheet 1
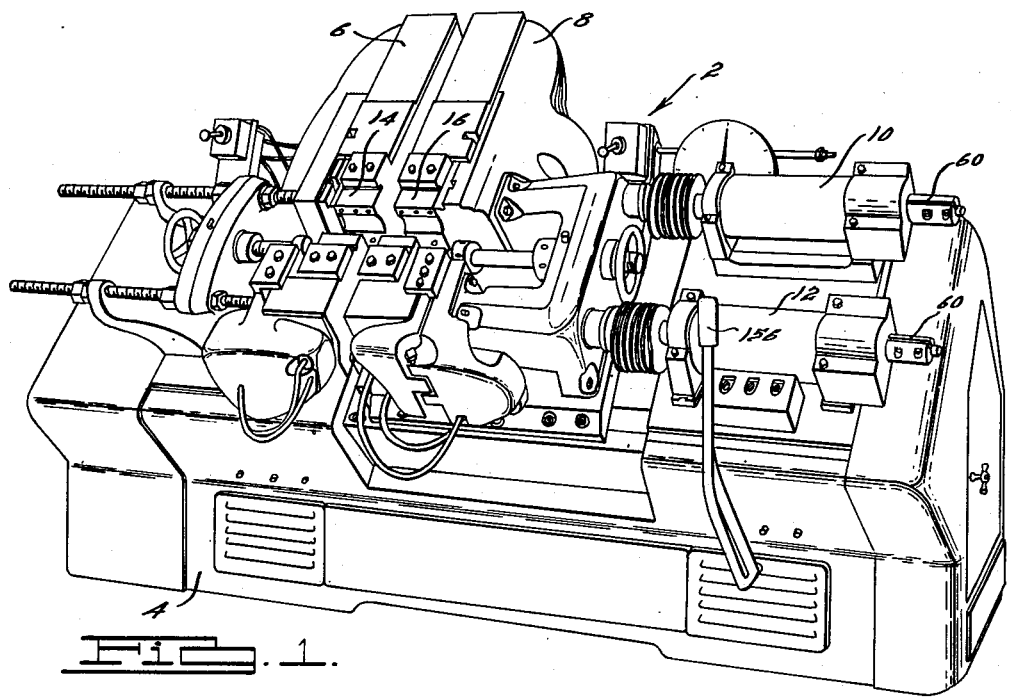
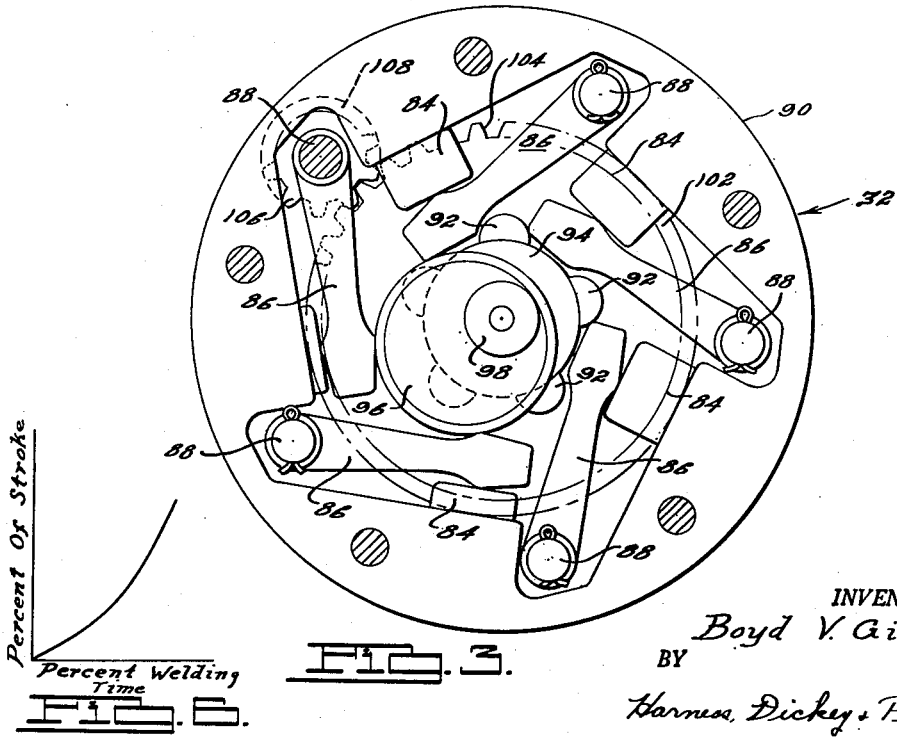
INVENTOR.
Boyd V. Giesey
BY
Harness, Dickey & Pierce.
ATTORNEYS.

July 10, 1951
B. V. GIESEY
2,560,283
FLUID CONTROL SYSTEM FOR FLASH WELDERS
Filed Nov. 15, 1946
2 Sheets-Sheet 2
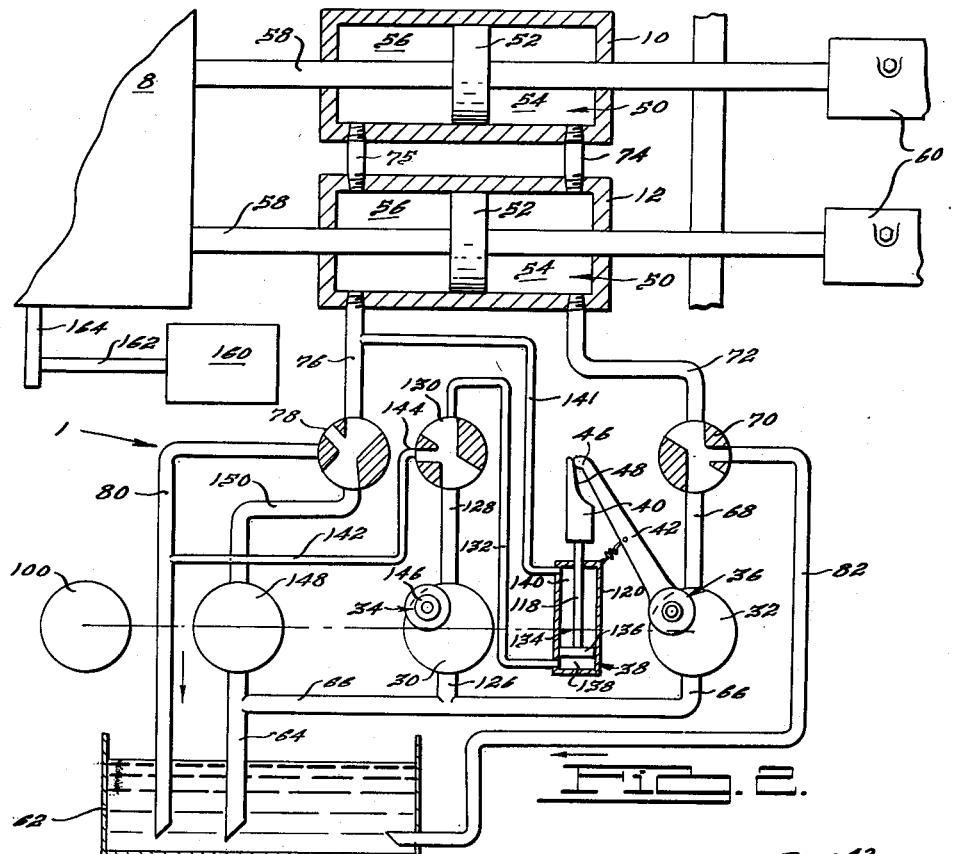
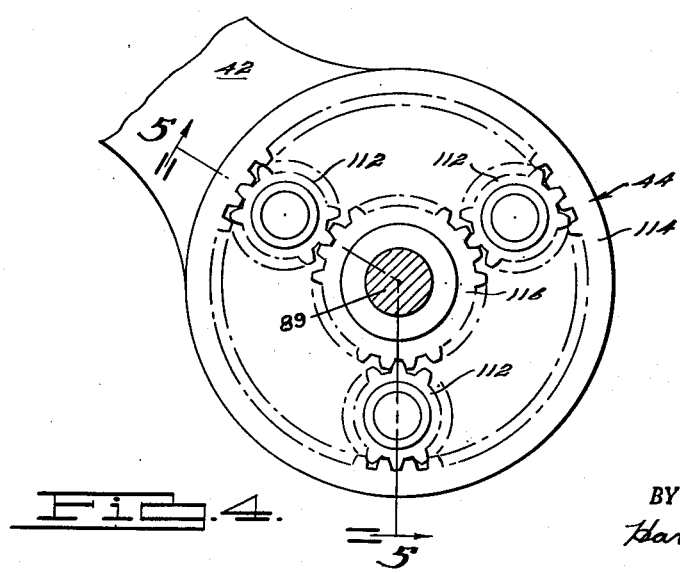
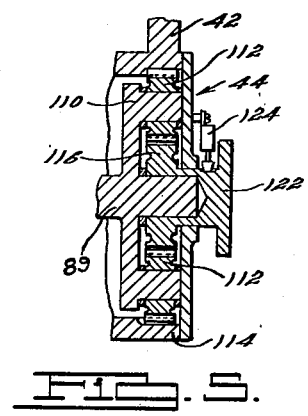
INVENTOR.
Boyd V. Giesey
BY
Harness, Dickey & Pierce
ATTORNEYS.

Patented July 10, 1951

2,560,283

UNITED STATES PATENT OFFICE 2,560,283

FLUID CONTROL SYSTEM FOR FLASH WELDERS

Boyd V. Giesey, Ferndale, Mich., assignor to Progressive Welder Company, Detroit, Mich., a corporation of Michigan Application November 15, 1946, Serial No. 710,195

21 Claims. (Cl. 60—52)

This invention relates generally to control system and more particularly to a hydraulic system for controlling the operation of a flash welding machine.

An object of this invention is to provide new fluid control system which is simple in arrangement, trouble-free in operation, and economical of manufacture.

Another object is to provide such a system in which the volume of fluid delivered, and consequently the movement of a member moved thereby, may have a determined changing rate throughout an operating sequence independently of the volume of fluid required or the time required for the particular sequence.

Another object of this invention is to provide a fluid feeding system for a flash welding machine in which the length of material to be flashed and the flashing time, or both, may be controlled.

A further object is to provide such a system in a flash welding machine so that the length of material to be flashed and/or the time of flashing may be changed to suit the individual requirements of the particular material and still maintain the same acceleration pattern of the material relative to the stroke irrespective of the flashing time.

A still further object is to provide an accelerating control which may be independently adjusted to correspond with the flashing time and a movement control actuated by the acceleration control and which may have its initial rate adjustable with respect to the acceleration control so that a welding machine may be used on a large variety of materials requiring differing flashing times and amounts of material to be burned off.

Other objects will be apparent from the description, drawings, and the appended claims.

A preferred but illustrative embodiment of the invention is shown in the accompanying drawings, and in which drawings:

Fig. 1 is a perspective view of a flash welding machine embodying the invention;

Fig. 2 is a schematic view of a fluid system for the welding mechanism and embodying the invention;

Fig. 3 is a view, with certain of the parts removed, showing a positive displacement pump which may be used in the invention;

Fig. 4 is a sectional view showing the adjustment between the cam-actuated lever and the displacement adjusting means of the pump;

Fig. 5 is a view taken substantially along the line 5—5 of Fig. 4; and

Fig. 6 is a diagrammatic view showing a typical rate pattern produced by the invention.

It will be appreciated, from a complete understanding of the present invention, that, in a generic sense, the improvement thereof may be embodied in fluid systems intended for various specific purposes and that such control systems may be variously arranged. In its present preferred form, the invention is utilized to control the feeding of material in flash-type welding machines, and, by way of illustration but not of limitation, the invention is so disclosed herein.

Referring to the drawings by characters of reference, the fluid control system, generally indicated at 1, is embodied in a flash-type welding machine generally indicated 2 having a unitary frame 4 having longitudinally extending substantially parallelly arranged spaced portions across which a relatively fixed but adjustable platen 6 is carried in a suitable manner. A movable platen 8 bridges the frame 4 and is carried by two spaced rectangular rails, one along the front of and one along the rear of the frame 4. Each rail is reciprocally carried in two spaced bearings located adjacent the end portions of the frame 4. In the case of welding machines for light work, three bearing points, two in front and one in the rear, may be used instead of four as described. The locations of the bearings adjacent end portions of the frame structure space them from the point of flashing of the work to be welded so that any burn off or flash spatter expelled during the flashing and which sticks to the rectangular rails will not secure itself to that portion of the rails which enter the bearings, thereby preventing bearing scoring. Movement of the platen 8 is controlled by means of a pair of actuated cylinders 10 and 12 rigidly secured to an upper face of the welding frame 4. Suitable dies 14 and 16 carried by the platens 6 and 8 respectively hold the work (not shown) which is to be flash welded.

During welding, the movable platen 8 is moved toward the fixed platen 6 for a predetermined distance and for a predetermined time, depending upon the metal to be flashed, after which the work may be upset, if desired. The welding current may be shut off before, after, or during upset. Subsequent to the completion of the weld, the parts are released and removed from the dies 14 and 16 and the platen 8 returned to its initial position. Since the use of upset is old in the art and many prior art systems for accomplishing the upset may be used, it is not believed necessary to show any mechanism therefor.

The fluid system for feeding the work during the flashing period comprises essentially a pair of variable positive displacement fluid pumps 30 and 32 having their displacement controlled by regulating means 34 and 36 respectively. Pump 32 supplies the fluid, which in the present instance is in liquid form, for driving the platen moving cylinders 10 and 12 at a controlled rate while the pump 30 drives an accelerating control mechanism 38. The mechanism 38 includes a cam member 40 which is moved throughout its normal stroke in the same time interval which is required for the flashing of the work, the regulating means 34 being adjustable to provide for this interrelation. The regulating means 36 of the pump 32 is linked to a lever arm 42 through an adjustable means 44 whereby, for any fixed position of the arm 42, a desired rate of fluid will be delivered by the pump 32 to the cylinders 10 and 12. The free end of the arm 42 has a cam follower portion 46 which engages the cam surface 48 of the cam member 40 whereby the rate of fluid delivered by the pump 32 is in accordance with a predetermined pattern as determined by the cam member 40 under control of the pump 30. With this arrangement it is possible to provide a controlled movement of the platen 8 whereby the same accelerating pattern thereof may be provided irrespective of the desired stroke length or welding time which may be required by the particular characteristics of the work being welded.

The cylinders 10 and 12 which actuate the platen 8 each comprise a piston chamber 50 in which is reciprocally positioned a piston 52 dividing the chamber 50 into a rear chamber portion 54 and a forward chamber portion 56. Each of the pistons 52 has a double-ended, externally extending piston rod 58, one end of which is attached to the movable platen 8 for movement thereof toward and away from the fixed platen 6 and the other end of which extends outwardly from the other end of the cylinders 10 and 12. Clamps 60 are carried by these last-named ends which are engageable with the adjacent walls of the cylinders 10 and 12 to limit final movement of the platen 8 toward the platen 6 to determine the final respective positions thereof. Liquid from a suitable source of supply such as a reservoir 62 flows through conduits 64 and 66 through the pump 32 and conduit 68 to a three-way valve 70. One outlet of the valve 70 communicates with a conduit 72 which is in open communication at its other end portion with the chamber portion 54 of the cylinder member 12. This chamber portion 54 is connected by a conduit 74 to the chamber portion 54 of the cylinder member 10.

A conduit 75 interconnects the chamber portions 56, and one of the chamber portions 56 is in open communication with a conduit 76 leading to a three-way valve 78. The valve 78 in one position provides a flow passageway from the conduit 76 to an exhaust conduit 80 opening into the reservoir 62. The valve 70 has an exhaust outlet connected by a conduit 82 to the reservoir 62 so that, when the valve 70 is in exhaust position, pump 32 merely circulates fluid from the reservoir 62 through conduits 64, 66, 68, and 82 and valve 70 back to the reservoir 62. The exhaust setting of the valve 70 also permits fluid to exhaust from the chambers 54 to the reservoir 62 upon movement of the pistons 52 toward the right (as viewed in Fig. 2). The exhaust setting of the valve 78 permits fluid to exhaust from the chambers 56 to the reservoir 62 upon movement of the pistons 52 toward the left.

The pump 32 is of a conventional variable positive displacement design including a plurality of pistons 84, the stroke of which is controlled by the regulating means 36. More specifically the pump 32 comprises arm members 86 pivoted on shafts or pins 88 carried by a pump housing or casing 90 which engage and move the pistons 84. The inward movement of the pistons 84 is limited by engagement of the arm members 86 with cam surfaces 92 of a cam adjusting member 94 centrally pivoted with respect to the pistons 84 in the housing 90 and forming part of the regulating means 36. An eccentric member 96 is driven by a shaft 98 which extends concentrically within the housing 90 and forms the journal about which the cam adjusting member 94 is rotatable. The shaft 98 may be driven by any suitable source of rotational power such as a motor 100 to rotate the eccentric 96. As the eccentric 96 rotates, it sequentially engages the various lever members 86 in succession and, as it passes thereby rotates each lever member 86 about its pivot pin 88, forcing the respective one of the piston members 84 radially outward to cause a predetermined quantity of fluid to be expelled from the piston chamber (not shown). The engagement of the lever members by the cam adjusting member 94 determines the inward limit of the stroke of the piston members 84 and consequently the amount of liquid to be expelled thereby for each revolution of the eccentric 96. The cam adjusting member 94 has a circular platelike portion 102 with spur teeth 104 along a portion of its periphery which mesh with teeth 106 of a pinion 108 secured to one of the pins 88. Rotation of the pinion 88 rotates the cam adjusting member 94 to move the cam surfaces 92 relative to the arm members 86 for adjusting the stroke length of the pistons 84 and consequently the capacity of the pump 32.

The one of the pins 88 of the positive displacement pump 32 controlling the pinion 108 and forming a part of the regulating means 36 carries at its outer end the adjusting means 44. This means 44 comprises a pinion-carrying spider 110 secured to the shaft 89 having the gear 108 and upon which is journaled three planet gears 112. These gears 112 mesh with a ring gear 114 and with a sun gear 116 journaled about an extension of the shaft 89. The lever arm 42 is integral with and extends outwardly from the ring gear 114 and has the cam follower portion 46 adjacent its outwardly extending end, which cam follower portion 46 engages with the cam surface 48 of the cam member 40 carried by an outwardly extending portion of a piston rod 118 of a fluid-actuated cylinder member 120. The sun gear 116 may be rotated by a suitable knob 122 to vary the relative positions of the lever arm 42 and shaft 89 whereby at a given relative position of the cam portion 46 with the cam member 40 the capacity of the pump 32 may be adjusted to provide for greater or less travel of the pistons 52 and platen 8 during movement of the cam member 40. A suitable detent or holding mechanism 124 may be provided to hold the sun gear 116 against undesired rotative movement about the shaft 89 on which it is journaled.

A branch conduit 126 of the conduit 66 leads to the positive displacement pump 30 similar to pump 32, driven by motor 100, and therethrough to a conduit 128, a valve 130, and a conduit 132 to the lower end of the cylinder member 120. The cylinder member 120 has a piston chamber 134 in which is reciprocally mounted a piston 136 having the piston rod 118 extending outwardly through the top wall of the cylinder member 120. The piston 136 divides the chamber 134 into a lower chamber portion 138 and an upper chamber portion 140. A conduit 141 communicatively connects the chamber portion 140 with the conduit 76 which, when the valve 78 is in exhaust position, communicatively connects the portion 140 for exhausting the fluid therefrom back to the reservoir 62. A branch conduit 142 connects the exhaust outlet 144 of the valve 130 to the exhaust conduit 80 so that, when the valve 130 is in exhaust position, the pump 30 merely circulates fluid from the reservoir 62 through conduits 64, 66, 126, 142, and 80 and valve 130 back to the reservoir 62. The one of the pins 88 carrying the pinion 108 of the pump 3 extends outwardly through the front face of its housing 90 and has secured to its outwardly extending portion a suitable knob 146 for controlling the regulating means 34 for varying the capacity of pump 30.

A pump 148 which need not be of the adjustable or positive displacement type is driven by the motor 100 and has its inlet connected to the conduit 64 and its outlet connected through a conduit 150 to the valve 78. With the valve 78 in one position, the pump 148 is operable to pump into the chambers 56. With the valve 78 in exhaust position, the pump 148 merely circulates fluid from the reservoir 62 through conduits 64, 150, and 80 and valve 78 back to the reservoir 62.

It is believed that the remaining constructional features of this invention may best be understood by a reference to the description to operation thereof which is as follows: Motor 100 is energized for driving the pumps 30, 32, and 148. With the valves 70, 78, and 130 set in the positions as shown, which is the return stroke position, fluid will flow through the conduit 64 and the pump 148 through the valve 78 and conduit 76 into the chamber portions 56 of the cylinder members 10 and 12 forcing the pistons 52 in a right-hand direction to bring the movable platen 8 to the desired open position with respect to platen 6. During this movement, fluid in the chamber portions 54 will escape through conduits 72 and 82 to the reservoir 62. Fluid will also flow from the pump 148 through conduit 141 to the chamber portion 140 of member 120 to force the piston 136 downward, the fluid in chamber portion 138 escaping through conduits 132, 144, and 80 to the reservoir 62, and the piston 136 will be moved to the lower limit of its stroke. The valve 78 is now returned to its exhaust position, and the platen 8 and piston 136 remain stationary.

The two workpieces which are to be flash welded are now inserted in the desired relationship with respect to each other and securely fastened by suitable means (not shown) in the dies 14 and 16 of the platens 6 and 8 respectively. This is done in the usual manner, and no detailed description or showing of the process by which the work is clamped in the jaws is believed necessary. The material now being clamped in the jaws, the valves 70 and 130 are rotated to close off their exhaust ports and the welding current turned on to start the flashing action. This action may be controlled by a hand lever 156 which is operable to manually move the platen 8 to the proper starting position, at which time the control valves 70 and 130 are rotated in the fluid-supplying positions and the flow of welding or flashing current initiated. This rotation of the valves 70 and 130 acts to close the exhaust ports of these valves, thereby directing the liquid flow from the pumps 32 and 30 through conduits 72 and 74 and 128 and 132 into chamber portions 54 and 138 respectively.

The pump 30 delivers liquid from the reservoir 62 to the chamber portion 138 at a predetermined constant fixed rate, depending upon the setting of the regulating means 34 moving the piston 136 upwardly in the chamber 134 exhausting fluid from the chamber portion 140 through the conduits 141, 76, and 80 and the valve 78 to the reservoir 62. The setting of the means 34 and consequently the movement of the piston 136 upwardly to its upper element is regulated so that the piston 136 will move the cam member 40 throughout a complete stroke in exactly the flashing time of the work being welded. During the time interval that the piston 136 is moving upwardly, fluid is delivered by the positive displacement pump 32 from the reservoir 62 through conduits 64, 66, 68, and 72 into the chamber portions 54, thereby moving the pistons 52 to the left and the movable platen 8 toward the fixed platen 6. The total amount of fluid which is delivered by the pump 32 during a welding cycle is controlled by the adjustment of the regulating means 36, while the rate of fluid delivered by the pump 32 is controlled by the cam member 40 due to the changing position of the arm 42 as the follower portion 46 thereof slides along the cam surface 48. Since the acceleration or increase in pumping rate of the pump 32, as controlled by the cam member 40, is to provide for a constant percentage change in movement throughout the flashing time irrespective of the magnitude of this time or of the length of work to be burned off, the initial discharge rate as controlled by the adjustable means 44 is such that during the selected welding time interval and consequently movement of the cam member 40 throughout the length of its stroke and the pump 32 will discharge a sufficient volume of fluid to move the pistons 52 and the platen 8 the required distance so that the desired length of the work will be burned off in the predetermined desired time. Since the volume of fluid delivered by the pump 32 is directly proportional to the time of its operation and its rate of delivery, the adjustable means 44 must be calibrated in accordance with a ratio the time welding bears to the length of material to be flashed off. Since the cam member moves throughout its length of travel in exactly the time that the platen 8 moves throughout its desired length in travel, the change in rate of at any fraction of the stroke of the platen 8 will be the same irrespective of the time required for the stroke (flashing). See Fig. 6. The pump 32 therefore has an average fluid discharge rate for any setting of the regulating means 34, and it therefore becomes necessary merely to adjust this average rate to give the desired travel in the length of time required for the particular travel. For example, one setting of the dial 122 is equal to a stroke of one-eighth inch in two seconds' time, equal to a stroke of one-half inch in eight seconds' time, and a stroke of one inch in sixteen seconds' time. The adjustable means 44 should therefore be calibrated according to the time stroke ratio being used. More specifically, as the cam member 40, and consequently its cam surface 48, is moved upwardly with the piston 136, the arm 42 will be rotated somewhat clockwise to rotate the shaft 89 having the pinion 108 to rotate the member 102 in a counterclockwise direction and moving the cam lobes 92 in a direction to allow the piston members 84 to have a greater stroke, thereby increasing the liquid output of the pump 32. The speed of movement of the movable platen 8 toward the fixed platen 6 will consequently increase during the time of movement of the platen 8 toward the platen 6. This increase in output of the positive displacement pump 32 with movement of the cam member 40 is controlled by the physical shape of the cam surface 48; however, with any fixed cam surface and constant setting of the regulating means 34 of the constant displacement pump 30 which maintains a fixed time for movement of the piston 136, any desired stroke length may be used depending upon the setting of the adjustable means 44.

Adjustment of the means 44 is accomplished by rotating the knob 122 which rotates the sun gear 116, causing rotation of the planet gears 112, thereby changing the relative position of the lever arm 42 and the shaft 89 and consequently the output of the pump 32 for any given relative position of the cam follower member 46 with the cam surface 48.

As is usual in flash welding machines, the machine is provided with an adjustable mechanically actuated control mechanism 160 actuated by a control member 162 carried by a bracket 164 of the movable platen 8. The mechanism 160 is operable to discontinue the flashing current to the machine and to initiate the upset control when such upset is used. In the event an upset step is used, the amount of material to be upset is controlled by engagement of adjustable clamps 60 with the end walls of the cylinders 10 and 12.

What is claimed and is desired to be secured by United States Letters Patent is as follows:

1. In a fluid-operated mechanism, means providing a piston chamber, a piston within said chamber and having a piston rod connected to a movable machine member, a positive displacement fluid delivery means operatively connected for delivering fluid to said chamber, means regulating the fluid delivered to said chamber by said delivery means, time responsive means actuated concurrently with but independently of the movement of said movable machine member and at a predetermined rate for controlling said regulating means, and means for presetting the magnitude of the fluid to be delivered by said delivery means in response to said time responsive means.

2. In a fluid-operated mechanism, a fluid receiving means having a member movable proportionally to the volume of fluid admitted to said means, a positive displacement fluid delivering means operatively connected to deliver fluid to said fluid receiving means, means controlling the output of said delivering means, rate controlling means, means having a predetermined time-rate actuating pattern for actuating said rate means concurrently with but independently of said member for determining the rate of change of output of said delivery means, and adjustable means interconnecting said rate means and said displacement controlling means for controlling the magnitude of the fluid delivered by said delivering means under control of said rate means.

3. In a fluid-operated mechanism, a fluid receiving means having a member movable in one direction directly proportional to the volume of fluid admitted to said means, a variable positive displacement fluid delivering means operatively connected to deliver fluid to said fluid receiving means for movement of said member in said direction, means controlling the displacement of said delivering means, rate controlling means movable concurrently with the movement of said member in said direction for determining the rate of change in displacement of said delivering means, means driven in accordance with a predetermined time-rate pattern for moving said rate controlling means independently of said movable member, means interconnecting said rate means and said displacement controlling means whereby said rate means is operable to control the change in rate of fluid supplied by said fluid delivering means to said receiving means so that said member is moved at varying rates in said direction, and means associated with said interconnecting means for controlling the initial postion of said displacement controlling means relative to said rate means.

4. In a control mechanism, a rate determining means having a predetermined range of determination, means for actuating said determining means throughout said predetermined range in a desired time interval, an element having a desired range of actuation, operative means for actuating said element, regulating means controlling the degree of actuation of said element by said operative means, and means effectively connecting said rate determining means and said regulating means in accordance with desired ratios of said time interval with respect to said desired range of actuation whereby said element may be actuated throughout said desired range of actuation in accordance with a preset pattern of per cent of said desired actuation to per cent of said desired time interval irrespective of the magnitudes chosen for said desired time interval and for said desired range of actuation.

5. In a hydraulic control system, a rate determining means having a predetermined range of determination, means for actuating said determining means throughout said predetermined range in a desired time interval, a liquid moved element having a desired length of travel, liquid propelling means for moving said element, regulating means controlling the output of said propelling means, and linkage operatively connecting said rate determining means and said regulating means including an adjustable means, said adjustable means being arranged to provide an adjustment between said rate determining means and said regulating means in accordance with the ratio of the chosen values of said time interval and said desired length of travel whereby said element may be moved in a predetermined rate pattern of per cent of movement with respect to per cent of time interval for any values of said time interval and for any values of said length of travel.

6. In a hydraulic control system, a cam member having a cam surface defining a change-of-rate pattern, means for moving said cam member along a predetermined path in a predetermined time interval, a hydraulic motor having an element moving portion, liquid propelling means for actuating said motor whereby said motor portion is moved, regulating means controlling the output of said motor, and linkage operatively connecting said cam surface and said regulating means including an adjustable means, said adjustable means being arranged to provide an adjustment between said cam surface and said regulating means in accordance with the ratio of the chosen values of said time interval and said desired length of travel whereby said element may be moved in a predetermined rate pattern of per cent of movement with respect to per cent of time interval for any values of said time interval and for any values of said length of travel.

7. In a fluid-operated mechanism, means providing a piston chamber, a piston movable in said chamber, means operable to deliver fluid to said chamber whereby said piston is moved in one direction, regulating means movable between two predetermined positions independently of the movement of said piston but concurrently therewith for controlling the change in rate of movement of said piston in said one direction, means operated by said regulating means and operatively connected thereto to control the flow of fluid from said fluid delivering means to said chamber whereby the rate of movement of said piston is controlled, and means for determining the total fluid supplied to said chamber during a desired time interval.

8. In a fluid-operated mechanism, means providing a piston chamber, a piston movable in said chamber, timing means controlling the time interval during which said piston is moved in one direction, means having a predetermined time-rate movement for actuating said timing means independently of the movement of said piston, means operable to deliver fluid to said chamber whereby said piston is moved in said one direction, means operated by said timing means for controlling said fluid delivering means to modulate a base rate of fluid delivery therefrom whereby the rate of movement of said piston is controlled, and means for determining the magnitude of said base rate for controlling the total movement of said piston during said time interval.

9. In a fluid-operated mechanism, a first means providing a first piston chamber, a first piston in said chamber, a first fluid delivering means operably connected to deliver fluid to said first chamber at a predetermined rate, a second means providing a second piston chamber, a second piston in said second chamber, a second fluid delivering means operably connected to deliver fluid to said second chamber at a predetermined rate concurrently with the delivery of fluid to said first chamber by said first delivering means, means associated with said second delivering means for controlling the rate of delivery of fluid from said second delivering means to said second chamber, and controlling means actuated by said first piston for actuating said associated means.

10. In a hydraulically operated mechanism, a first means providing a first piston chamber, a first piston in said chamber, a first positive displacement liquid pump operably connected to deliver liquid to said first chamber at a predetermined rate, a second means providing a second piston chamber, a second piston in said second chamber, a second positive displacement liquid pump operably connected to deliver liquid to said second chamber concurrently with the delivery of liquid by said first pump to said first chamber at a predetermined rate, means associated with said second pump for controlling displacement thereof whereby the rate of delivery of liquid from said second pump to said second chamber may be controlled, cam means actuated by said first piston, and lever means coacting with said cam means for controlling said associated means.

11. In a hydraulically operated mechanism, a first means providing a first piston chamber, a first piston in said chamber, a first positive displacement liquid pump operably connected to deliver liquid to said first chamber at a predetermined rate, a second means providing a second piston chamber, a second piston in said second chamber, a second positive displacement liquid pump operably connected to deliver liquid to said second chamber at a predetermined rate, means associated with said second pump for controlling displacement thereof whereby the rate of delivery of liquid from said second pump to said second chamber may be controlled, cam means actuated by said first piston, lever means engageable with said cam means and adjustable means for connecting said lever means to said associated means whereby the rate of liquid delivered to said second pump for a given position of said cam means may be adjusted.

12. In a control mechanism for a movable element, means operable to cause movement of the element through a working stroke, means for varying the rate at which the element is moved by said first-named means, and mechanically driven movable means having a predetermined time-movement characteristic and movable independently of the movable element but concurrently therewith for regulating said varying means during the working stroke whereby said first-named means is operable to move the element in accordance with a predetermined rate pattern.

13. In a control mechanism for a movable element, means operable to cause movement of the element through a working stroke, means for varying the rate at which the element is moved by said first-named means, and mechanically driven movable means having a predetermined time-movement characteristic and movable independently of the movable element but concurrently therewith for regulating said varying means during the working stroke whereby said first-named means is operable to move the element in accordance with a predetermined varying rate pattern.

14. In a control mechanism for a movable element, means operable to cause movement of the element through a working stroke, means for varying the rate at which the element is moved by said first-named means, and mechanically driven movable means having a predetermined time-movement characteristic and movable independently of the movable element but concurrently therewith between two positions concurrently with the movement of the element and operable to regulate said varying means to control the rate of movement of the element during the working stroke.

15. The combination of claim 14 in which drive means are provided for moving said last-named means between its said two positions in a predetermined time interval, said interval being the same as the time interval for movement of the element throughout said working stroke.

16. The combination of claim 15 in which said drive means is movable at a constant speed throughout its said time interval.

17. In a control mechanism for a movable element, means operable to cause movement of the element throughout a working stroke, means for varying the rate at which the element is moved by said first-named means, and independently driven means operable independently of the element but concurrently with the working stroke and in accordance with a function of time for controlling said varying means whereby the rate of movement of the element during the working stroke will follow a predetermined time pattern.

18. The combination of claim 17 in which said time pattern is one providing for a progressively increasing rate.

19. In a mechanism for controlling the movement of an apparatus between preselected limits, a first means operable to move the apparatus, a controlling element including a movable cam element having a preselected path of movement, means independent of the apparatus for actuating said controlling element whereby said cam element is moved through said preselected path simultaneously with the movement of said element between said limits and a regulating means for varying the operation of said first means whereby said first means is effective to move the apparatus at a plurality of rates, said last-named means being operatively associated with said cam element whereby said cam element is effective to determine said rate of movement of the apparatus.

20. The combination of claim 19 in which said controlling element actuating means actuates said cam element in accordance with a predetermined rate pattern and between predetermined fixed limits, and in which additional means is provided for adjusting the rate of movement imparted to the apparatus for a given position of said cam element.

21. In a movement controlling mechanism for a movable apparatus movable between two predetermined portions, accelerating control means having an element movable between predetermined limits, means for moving said element between said limits concurrently with the movement of the apparatus between its two positions, cam means driven by said accelerating means element, means controlling the movement of said moving means, means actuated by said cam means for controlling said controlling means, and adjustable means interconnecting said actuated means and said first-named controlling means for determining the movement of said moving means by said cam means.

BOYD V. GIESEY.

REFERENCES CITED

The following references are of record in the file of this patent:

UNITED STATES PATENTS

| Number | Name | Date |
|---|---|---|
| 2,005,018 | West | June 18, 1935 |
| 2,080,810 | Douglas | May 18, 1937 |
| 2,157,240 | Keel | May 9, 1939 |
| 2,192,778 | Stacy | Mar. 5, 1940 |
| 2,331,046 | Robinson | Oct. 5, 1943 |

FOREIGN PATENTS

| Number | Country | Date |
|---|---|---|
| 392,897 | Great Britain | Aug. 19, 1931 |